United States Patent [19]

Fujita

[11] Patent Number: 5,060,535
[45] Date of Patent: Oct. 29, 1991

[54] STEERING WHEEL

[75] Inventor: Yoshiyuki Fujita, Inazawa, Japan

[73] Assignee: Toyoda Gosei Co., Ltd., Nishikasugai, Japan

[21] Appl. No.: 505,492

[22] Filed: Apr. 6, 1990

[30] Foreign Application Priority Data

Apr. 22, 1989 [JP] Japan .................. 1-102321

[51] Int. Cl.$^5$ ............................. B62D 1/08
[52] U.S. Cl. ...................... 74/552; 74/558; 29/894.1
[58] Field of Search ............... 74/552, 558; 29/894.1

[56] References Cited

U.S. PATENT DOCUMENTS

| | | | |
|---|---|---|---|
| 3,893,349 | 7/1975 | Stent | 74/552 |
| 3,948,118 | 4/1976 | Garbin | 74/552 |
| 4,061,054 | 12/1977 | Wenninger | 74/552 |
| 4,325,568 | 4/1982 | Clark et al. | 74/552 |
| 4,359,911 | 11/1982 | Eubanks et al. | 74/552 |
| 4,633,731 | 1/1987 | Kurata | 74/492 |
| 4,648,164 | 3/1987 | Hyodo et al. | 29/159 B |
| 4,709,944 | 12/1987 | Hongo et al. | 280/777 |
| 4,879,923 | 11/1989 | Nagata | 74/552 |

FOREIGN PATENT DOCUMENTS

| | | |
|---|---|---|
| 2530594 | 1/1977 | Fed. Rep. of Germany . |
| 2944411 | 6/1980 | Fed. Rep. of Germany . |
| 60-9764 | 1/1985 | Japan . |

Primary Examiner—Allan D. Herrmann
Assistant Examiner—Winnie Yip
Attorney, Agent, or Firm—Cushman, Darby & Cushman

[57] ABSTRACT

A steering wheel comprises a ring section, a boss section arranged at the center of the ring section, at least two spoke sections extending radially outward from the boss section and connected to the ring section, a ring core arranged in the ring section, a boss arranged in the boss section, and a unitary integral connecting plate connecting the ring core member and the boss, which connecting plate comprises a base part adjacent to the boss and a spoke part extending radially outward from the base part and connected to the ring core member, the connecting plate undergoing plastic deformation when subjected to a deforming force of impact, the deformation causing the ring section to become substantially perpendicular to the direction of the force of impact.

8 Claims, 7 Drawing Sheets

STEERING WHEEL

BACKGROUND OF THE INVENTION

1. Field of the Invention

This invention relates to a steering wheel provided with a self-aligning mechanism, which, when a force of impact acts on a ring section, makes the plane of the ring section substantially perpendicular to the direction of the force of impact.

2. Description of the Prior Art

FIG. 1 shows a conventional steering wheel provided with a self-aligning mechanism (see Japanese Utility Model Laid-Open No. 60-9764: U.S. Pat. No. 4,709,944, U.S. Pat. No. 3,948,118).

The steering wheel WO includes a steering wheel core member CO comprising core element 4 of a ring section R, core elements 3 of spoke sections S, a boss 1 of a boss section B which is connected to a steering shaft not shown, and a boss plate 2 for connecting the boss 1 and the spoke section core elements 3 together. Each core element of each section is made of steel and connected to other elements by welding.

The boss plate 2 of the steering wheel WO has a plurality of through holes 2a formed around the boss 1, thereby constituting the self-aligning mechanism. That is, the boss plate 2 has deformable portions 2b defined by low-rigidity narrow portions between the through holes 2a, so that when a force of impact acts on the ring section R of the steering wheel WO attached to a steering shaft, the deformable portions 2b undergo plastic deformation. As a result, the plane of the ring section R becomes substantially perpendicular to the direction of the force of impact.

2c designates reinforcing ribs which project upward from the periphery of the boss plate 2 to reliably deform the deformable portions 2b when the force of impact acts on the ring section R. 2d and 2e designate puller holes and mounting holes used in mounting functional components, such as a horn switch mechanism. These holes 2d; 2e also serve like the through holes 2a for defining the deformable portions 2b.

However, since the steering wheel core member CO of the conventional steering wheel WO is manufactured by connecting all the core elements of the individual sections together by welding, the number of manufacturing steps and the manufacturing cost of the steering wheel WO increase.

Further, some overlap width of welding must be included in each core element of each section to weld them with a given strength of welding, leading to a corresponding increase in size of the core member CO; thus, the weight of the steering wheel core member CO and the weight of the steering wheel WO increases.

SUMMARY OF THE INVENTION

It is an object of the present invention to provide a steering wheel which, even when a self-aligning mechanism is included therein, can be manufactured with a reduced number of manufacturing steps and a reduced manufacturing cost and can be made compact and light in weight.

The foregoing object is accomplished by a steering wheel which comprises a ring section having a core member; a boss section having a boss and arranged at the center of said ring section; and a unitary integral connecting plate connecting said ring core member and said boss. The connecting plate comprises a base part adjacent to said boss and a spoke part extending radially outward from said base part and connected to said ring core member, said connecting plate undergoing plastic deformation when subjected to a deforming force of impact, said deformation causing said ring section to become substantially perpendicular to the direction of said force of impact.

In the steering wheel according to the present invention, a steering wheel core member having the unitary integral connecting plate made from a spoke part (the spoke section core elements) and a base plate (the boss plate) (being independent of each other in the prior art); thus, the work of welding the spoke part and the base part together (required in the prior art) is not necessary, hence, the number of manufacturing steps and the manufacturing cost of the steering wheel core member can be reduced, whereby the steering wheel can be manufactured readily.

Further, since the process of welding the spoke part and the base part together (required in the prior art) becomes unnecessary, the overlap width of welding necessary to weld them with a given strength becomes unnecessary. Thus, the steering wheel core member can be made compact and light in weight.

Further, since the spoke part and the base part are formed by the compact unitary integral connecting plate, the characteristic frequency of the steering wheel can be increased, whereby its resonance with the characteristic frequency of a vehicle body during idling or the like can be prevented.

DESCRIPTION OF THE PREFERRED EMBODIMENTS

Figure 1:
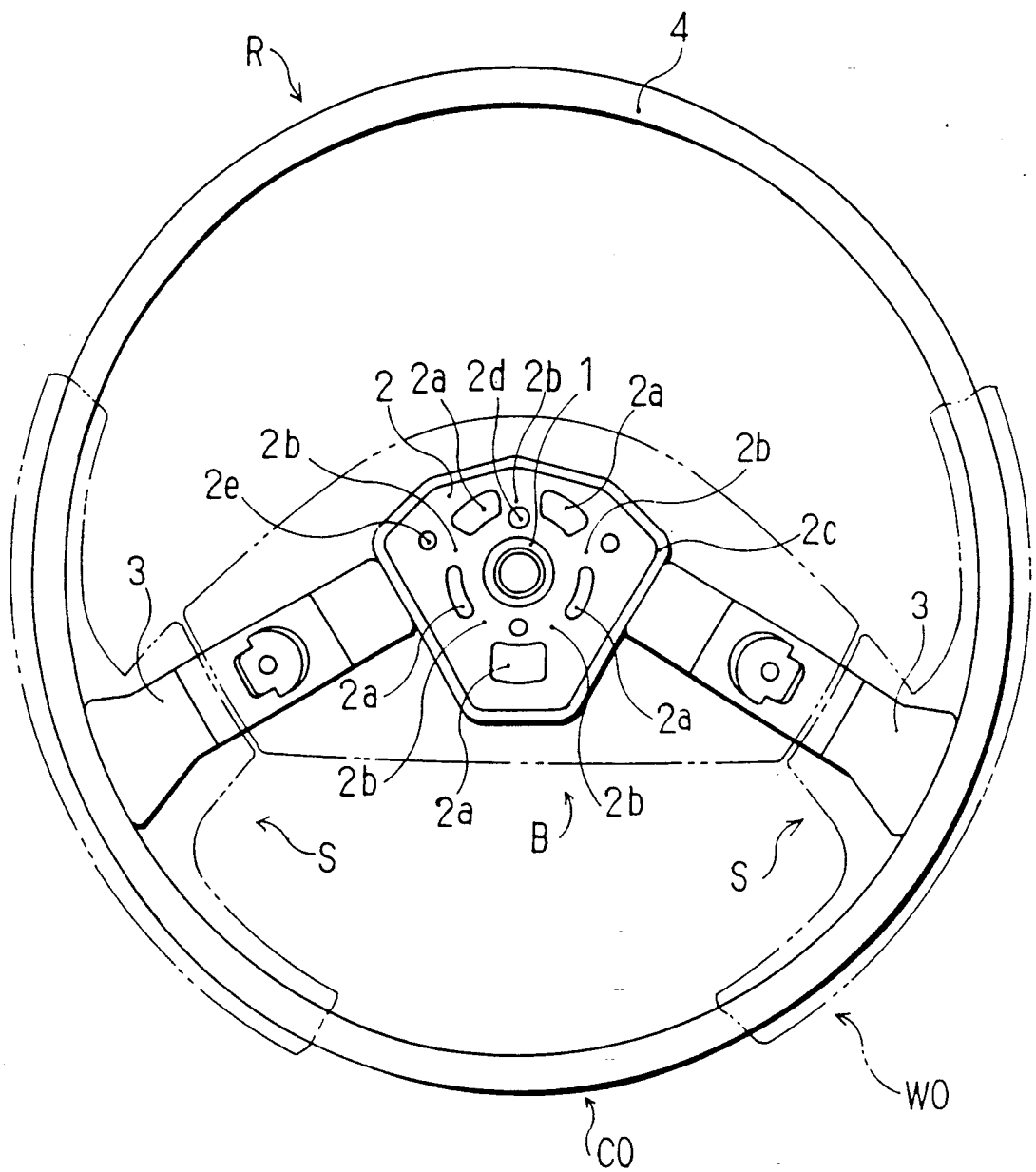
FIG. 1 is a plan view showing a conventional steering wheel.
Figure 2:
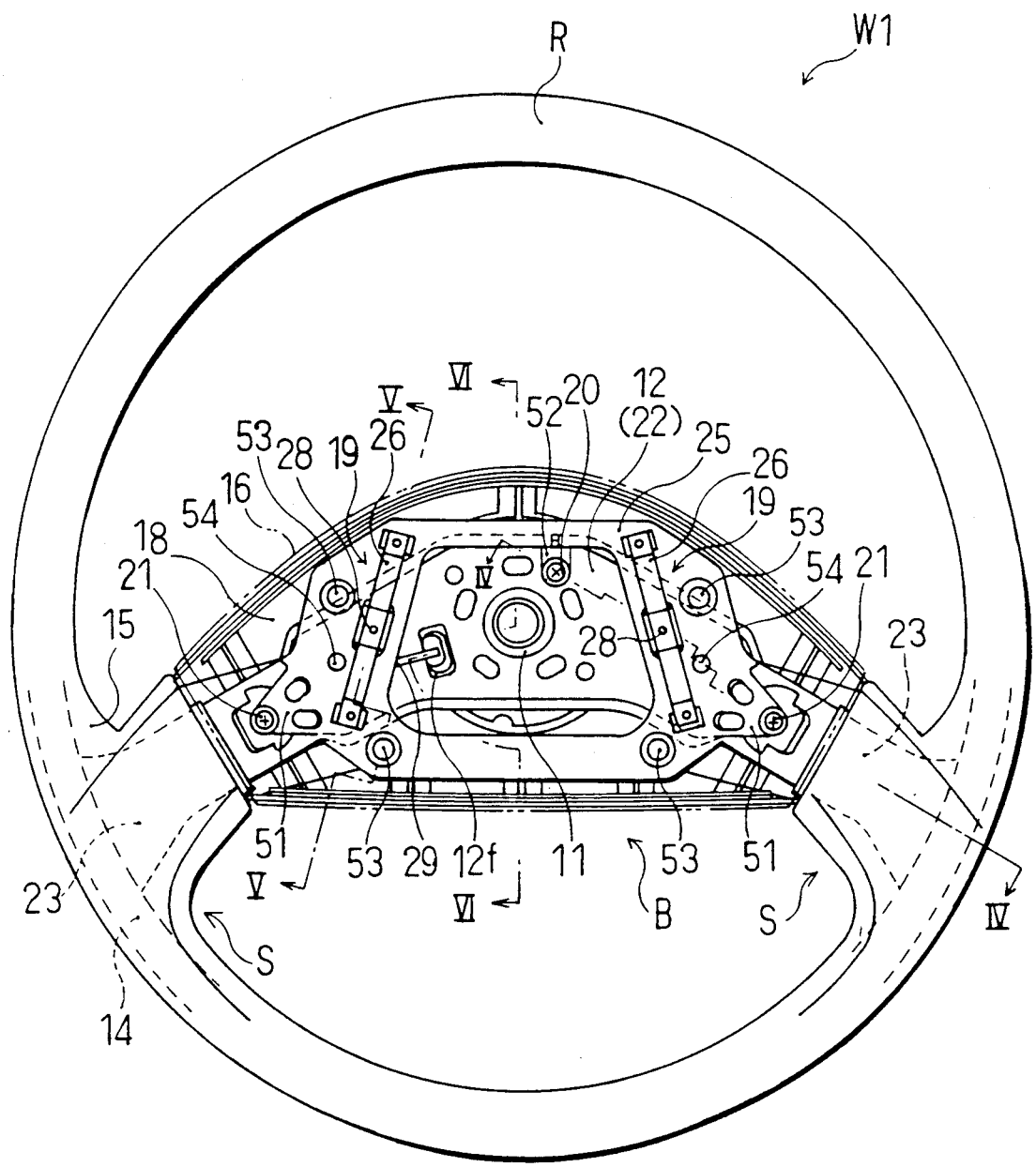
FIG. 2 is a plan view showing a steering wheel with a horn pad removed according to an embodiment of the present invention.

In FIG. 2, a steering wheel W1 according to an embodiment of the present invention comprises a ring section R, a boss section B arranged at the center of the ring section R, and two spoke sections S extending radially outward from the boss section B.

Figure 3:
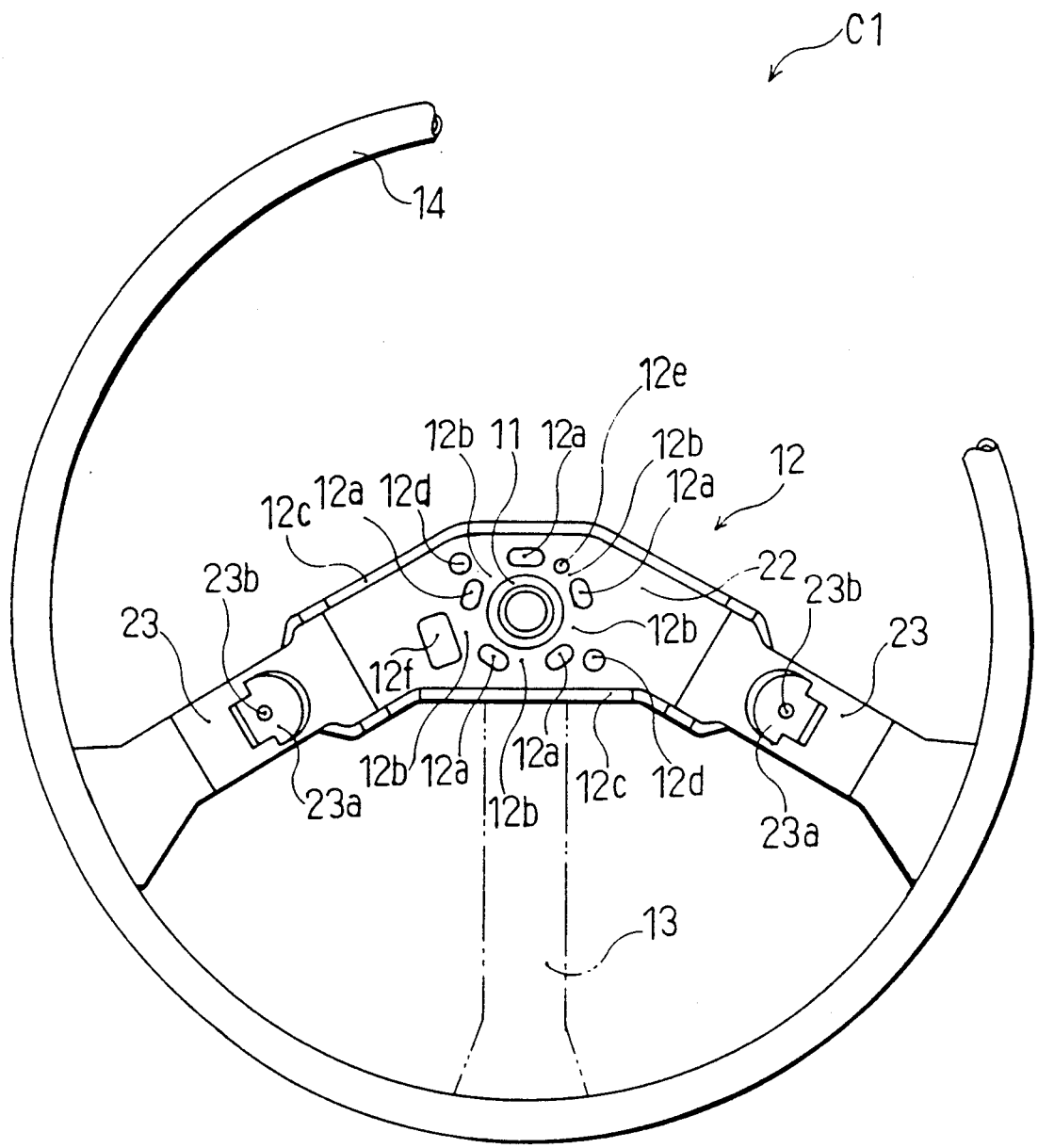
FIG. 3 is a plan view showing a steering wheel core member used in the embodiment.

As shown in FIG. 3, a steering wheel core member C1 of the steering wheel W1 comprises a core member 14 made of a ring-shaped steel pipe and arranged in the ring section R, a steel boss 11 arranged in the boss section B which is connected to a steering shaft 5 (see FIG.

7) and a unitary integral connecting plate 12 made of steel sheet which connects the boss 11 and the ring core member 14 together.

The connecting plate 12 comprises a base part 22 connected to the boss 11 and two spoke parts 23 extending obliquely upward from the base part 22 and connected to the ring core member 14.

The base part 22 constitutes a self-aligning mechanism which, when a force of impact acts on the ring section R after attachment to the steering shaft 5, makes the plane of the ring section R substantially perpendicular to the direction of the force of impact. The base part 22 has a plurality of vertical through holes 12a formed around the boss 11 such that low-rigidity deformable portions 12b are left between the through holes 12a which undergo plastic deformation when the force of impact acts thereon.

Figure 6:
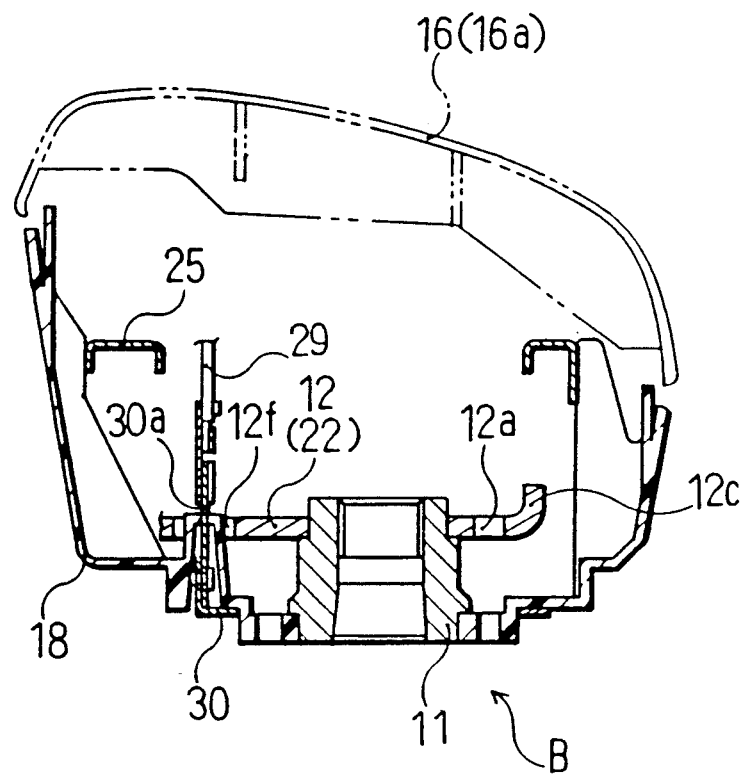
FIG. 6 is a fragmentary sectional view taken along line VI—VI in FIG. 2.

Ribs 12c project upward from the margin of the base part 22 and from a portion of the margin of each spoke part 23. The ribs 12c are provided to reliably deform the deformable portions 12b when the force of impact acts on the ring section R. Puller holes, 12d a mounting hole 12e used in mounting a stationary contact plate 25 of a horn switch mechanism 19 hereinafter described, and opening 12f through which a tongue piece 30a of a slip ring 30 hereinafter described passes, serve like the through holes 12a for defining the deformable portions 12b (see FIGS. 2, 3 and 6).

Figure 4:
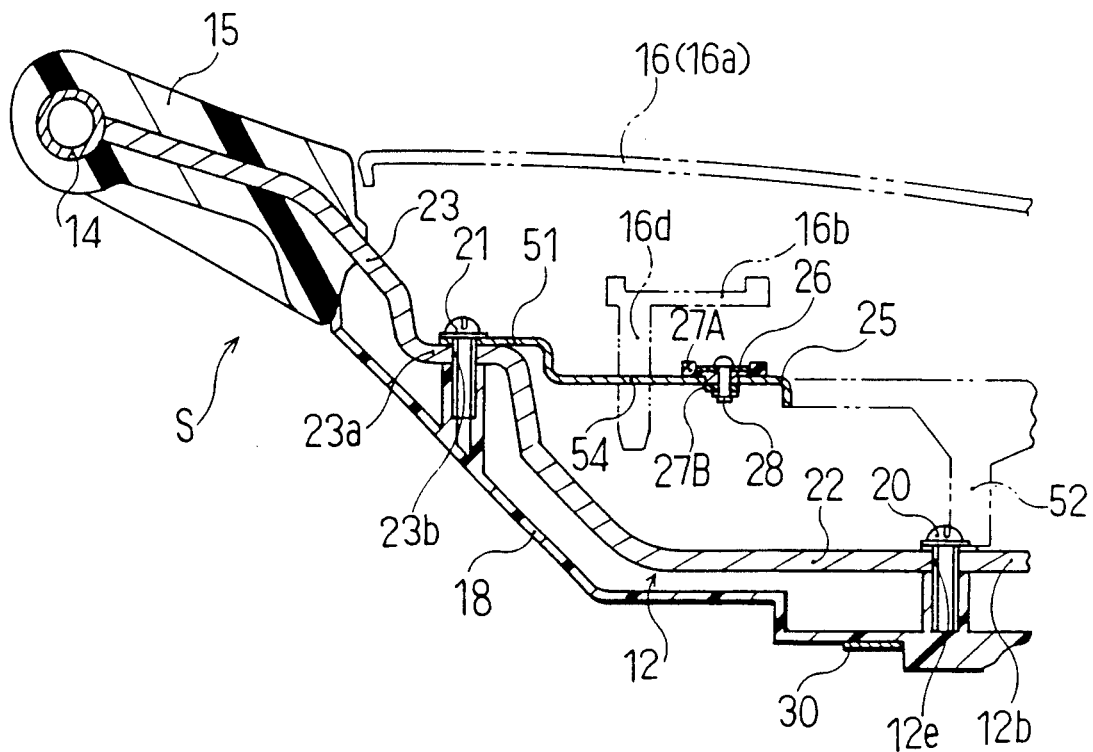
FIG. 4 is a fragmentary sectional view taken along line IV—IV in FIG. 2.
Figure 5:
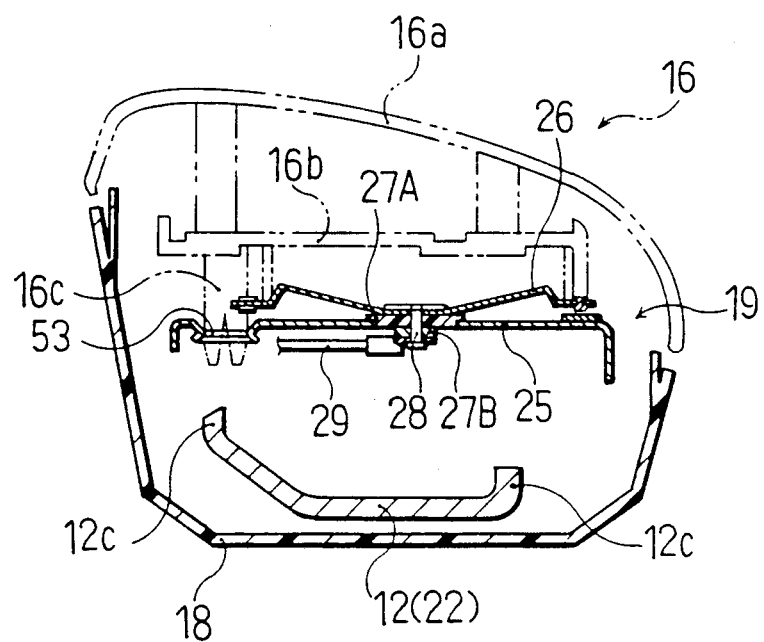
FIG. 5 is a fragmentary sectional view taken along line V—V in FIG. 2.

The spoke part 23 extends obliquely upward from the base part 22, and has a mounting position 23a formed in an intermediate portion thereof which in turn has a mounting hole 23b used in fixing the stationary contact plate 25 by a screw 21 (see FIGS. 3 and 4).

The connecting plate 12 with the through holes 12a and the like is shaped by subjecting a steel sheet of given shape to stamping or the like.

As shown in FIGS. 2, and 4 through 6, the horn switch mechanism 19 comprises the stationary contact plate 25 made of sheet metal which is substantially quadrangular when viewed from above, and a movable contact plate 26 made of a metal leaf spring which is fixed to the stationary contact plate 25 by a rivet 28 with interposition of electrical insulating spacers 27A and 27B. The stationary contact plate 25 is fixed to the steering wheel core member C1 by fixing both mounting end portions 51 and 51 of the stationary contact plate 25 to the mounting positions 23a of the spoke part 23 by screws 21 and fixing a lower portion of a tongue piece 52 extending downward from the front margin of the stationary contact plate 25 to the base part 22 by a screw 20.

It should be noted that when the stationary contact plate 25 is fixed to the steering wheel core member C1 by the screws 20 and 21, a lower cover 18 made of synthetic resin and used to cover a lower portion of the steering wheel W1 is also attached to the steering wheel core member C1 at the same time.

After being fixed to the steering wheel core member C1, the stationary contact plate 25 can be electrically connected to the negative side of a horn circuit via the core member C1, whereas the movable contact plate 26 is electrically connected, via a lead wire 29 connected to the rivet 28, to the tongue piece 30a of the slip ring 30 which is fixed in a lower portion of the lower cover 18 and capable of electrical connection to the positive side of the horn circuit.

In the steering wheel W1 of the embodiment, a horn pad 16 made of synthetic resin is provided so as to cover the boss section B and the spoke sections S (see FIGS. 2, and 4 through 6). The horn pad 16 comprises a pad body 16a arranged on the upper side and an auxiliary plate 16b fixed to the under side of the pad body 16a by screws not shown. The auxiliary plate 16b has four lock legs 16c projecting downward at given positions and two guide protrusions 16d. The horn pad 16 is fixed to the stationary contact plate 25 by inserting the guide protrusions 16d of the auxiliary plate 16b connected to the pad body 16a in openings 54 formed in the stationary contact plate 25 and locking the lock legs 16c of the auxiliary plate 16b in lock holes 53 formed in the stationary contact plate 25.

In FIGS. 2 and 4, a coating layer is of synthetic resin is provided to cover the core element 14 of the ring section R and partially each spoke part 23 of the connecting plate 12 which serves as the core member of each spoke section S.

The manufacturing process of the steering wheel W1 of the embodiment will be described.

First, the steering wheel core member C1 is manufactured by welding the connecting plate 12 (shaped to a given shape by stamping and boring) to the boss 11 and the ring section core element 14. Here, the number of welding position is three (that are between the connecting plate 12 and the boss 11 and between the connecting plate 12 and the ring core member 14), this being smaller than the number of welding position of the conventional steering wheel core member C0 (equal to five). Thus, the welding process can be achieved readily, the overlap width of welding can be reduced, the number of manufacturing steps, manufacturing cost and weight of the steering wheel core member C1 can be decreased, and the steering wheel core member C1 can be made compact.

After the steering wheel core member C1 is manufactured, the steering wheel core member C1 is set in a given metal mold, and the coating layer 15 is formed by injection molding or the like.

Then, the stationary contact plate 25 with the movable contact plate 26 arranged thereon, together with the lower cover 18 with the slip ring 30 arranged thereto, is fixed to the steering wheel core member C1 by the screws 20 and 21. At this time, the lead wire 29 is of course connected to the slip ring 30.

Then, by inserting and locking the guide protrusions 16d and lock legs 16c in the openings 54 and lock holes 53, the horn pad 16 made up integrally of the pad body 16a and the auxiliary plate 16b is fixed to the stationary contact plate 25, whereby the manufacture of the steering wheel W1 is complete.

In the steering wheel core member C1 of the steering wheel W1 of the embodiment, the spoke parts and the base part (which are independent of each other in the prior art) are formed integrally by the unitary integral connecting plate 12. Therefore, the work of welding the spoke part and the base part together (required in the prior art) is not necessary; thus, the number of manufactuirng steps and the manufacturing cost of the steering wheel core member C1 can be reduced, hence, the steering wheel W1 can be manufactured readily. Further, because of no need to weld the spoke part and the base part together in contrast with the prior art, any overlap width of welding hitherto considered to weld them is not required; thus, the steering wheel core member C1 can be made compact and light in weight, hence, the steering wheel W1 can be made compact and light in weight. Further, since the spoke parts 23 and the base part 22 make up the unitary integral connecting plate 12, the characteristic frequency of the steering wheel W1 can be increased, whereby its resonance with the characteristic frequency of the vehicle body during idling or the like can be prevented.

Figure 7:
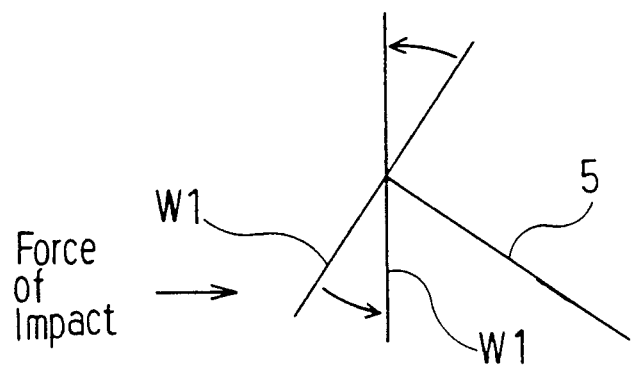
FIG. 7 is an explanatory diagram showing a self-aligning mechanism in the embodiment.

The foregoing embodiment has been described such that the connecting plate 12 of the steering wheel core member C1 has the ribs 12c projecting from the margin of the base part portion 22 and from a portion of the margin of each spoke part 23 so that the deformable portions 12b between the through holes 12a and 12a and the like (inclusive of the puller holes 12d) can reliably undergo plastic deformation when the force of impact acts on the ring section R (see FIG. 7).

Figure 8:
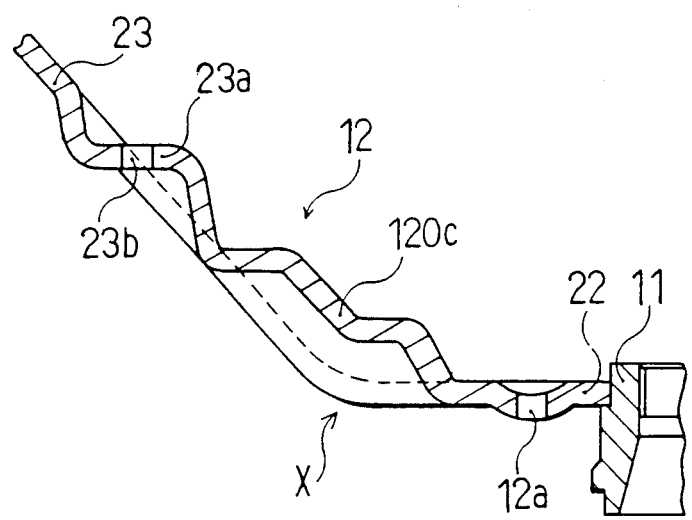
FIG. 8 is a fragmentary sectional view showing another steering wheel core member used in another embodiment, taken along line VIII—VIII in FIG. 9.
Figure 9:
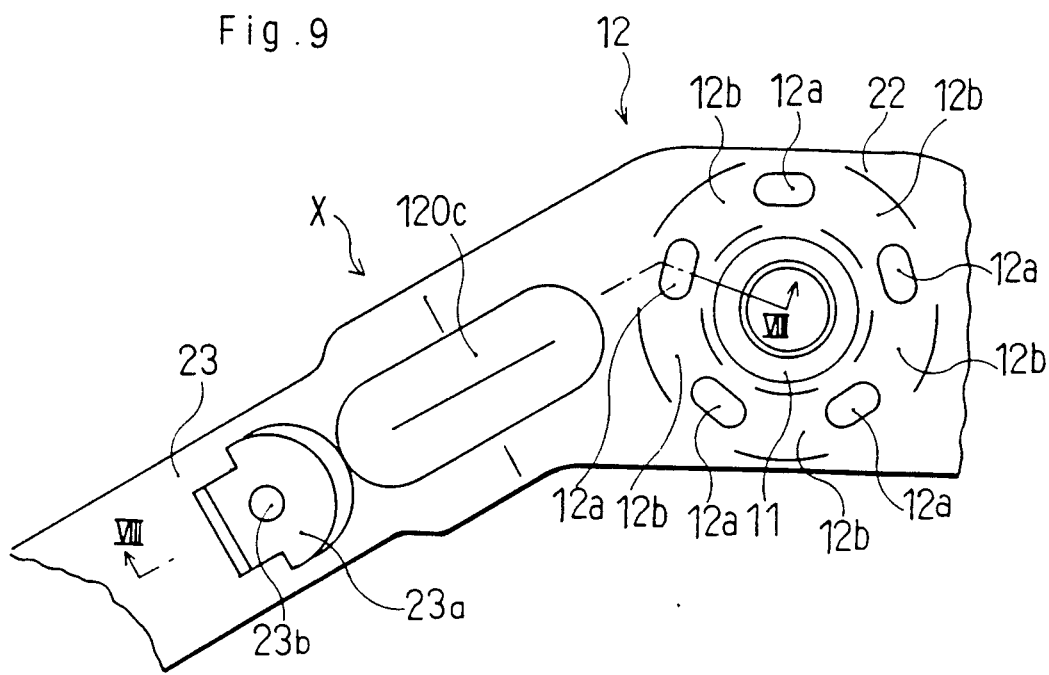
FIG. 9 is a fragmentary plan view showing the steering wheel core member shown in FIG. 8.

In this connection, the foregoing structure may be changed as shown in FIGS. 8 and 9 so that the deformable portions 12b of the connecting plate 12 can deform reliably. That is, in the steering wheel core member shown in these drawings, a raised reinforcing rib 120c is formed by stamping in a curved connecting portion X between the base part 22 and each spoke part 23. Curved curved connecting portion X easily suffers stress concentration and deforms when the force of impact acts on the ring section R. Further, as shown in FIGS. 8 and 9, each deformable portion 12b and its vicinity may be curved downward to assume a substantial U-shape such that each deformable portion 12b becomes readily deformable.

The foregoing embodiment has been described such that the steering wheel W1 has the two spoke section S. In this connection, if three or more spoke sections S are desired for the steering wheel, as illustrated by the two-dot chain line in FIG. 3, a desired steering wheel core member having an additional spoke section may be manufactured by welding a separate spoke core member 13 made of steel sheet to the base part 22 of the connecting plate 12 and to the ring core member 14.

Figure 10:
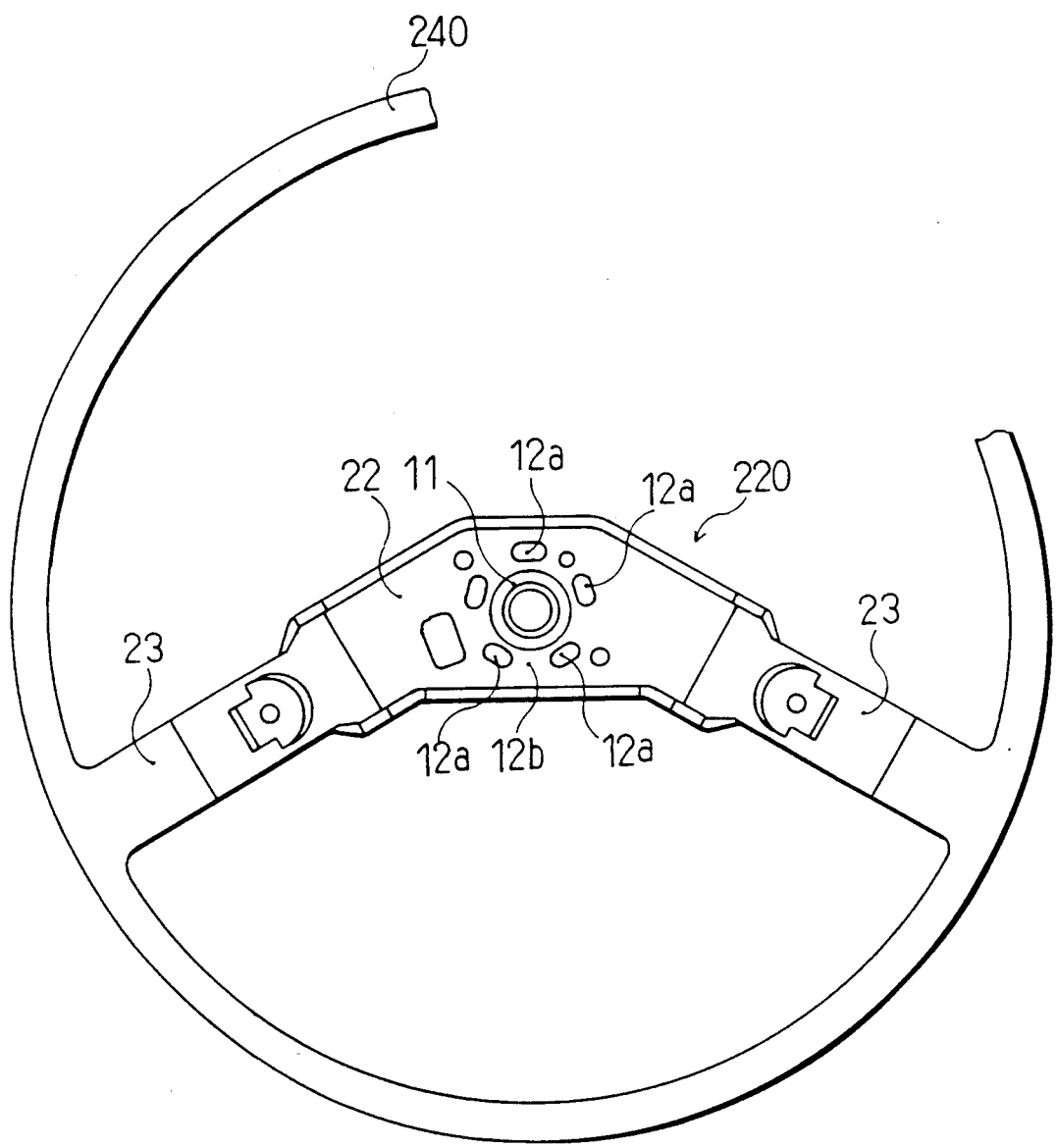
FIG. 10 is a plan view showing a further steering wheel core member used in a further embodiment.

Further, the foregoing embodiment has been described such that the steering wheel core member C1 includes the connecting plate 12 made of steel sheet which corresponds to an integral combination of the conventional boss plate and spoke section core elements. In this connection, in order to constitute the self-aligning mechanism, it is sufficient that the base part 22 of the connecting plate 12 have the given through holes 12a and deformable portions 12b formed therein, and the connecting plate 12 may be made of a different material capable of plastic deformation. Further, where a connecting plate 220 as shown in FIG. 10 is to be made of a die casting metal capable of plastic deformation, such as light alloy aluminum, a ring section core element 240 may also be made of a die casting metal integrally at the same time.

What is claimed is:

1. A steering wheel comprising:
   a curved ring section having a core member and a center of curvature, said core member being covered with a coating layer, said coating layer partially covering a spoke member that extends inward from said core member;
   a boss section having a boss and being disposed at the center of curvature of said ring section;
   a unitary integral connecting plate connecting said core member and said boss, said connecting plate being deformable at least in part and including a base part adjacent to said boss and said spoke part extending radially outward from said base part and connected to said core member; and
   a rib member being integral with and extending from said base part to said spoke part, said rib member terminating prior to the portion of said spoke part covered with said coating layer;
   wherein said connecting plate undergoes plastic deformation when subjected to an impacting deforming force, said deformation causing said ring section to become substantially perpendicular to the direction of said deforming force.

2. A steering wheel according to claim 1, wherein said base part of said connecting plate has a plurality of through holes formed therein, and said base part between said through holes serves as deformable portions which undergo plastic deformation when said force of impact acts on said ring section.

3. A steering wheel according to claim 2, wherein said deformable portion is curved downward to assume a substantial U-shape.

4. A steering wheel according to claim 1, further comprising reinforcing ribs formed on said connecting plate which project from the margin of said base part and from a portion of the margin of each spoke part.

5. A steering wheel according to claim 1, wherein each spoke part of said connecting plate extends upward from said base part of said connecting plate in curved form, and a raised reinforcing rib is formed in a inner portion of said curved portion of each spoke part which extends from said base part to each spoke part.

6. A steering wheel according to claim 1, wherein said boss, said connecting plate, and said core member are made of steel.

7. A steering wheel according to claim 1, further including a separate spoke core member made of steel which is connected between said connecting plate and said core member.

8. A steering wheel according to claim 1, wherein said connecting plate and said core member are formed integrally from a die cast metal.

* * * * *